June 28, 1955
C. C. SAXON
2,711,908
TRAILER HITCH
Filed April 3, 1953
2 Sheets-Sheet 1
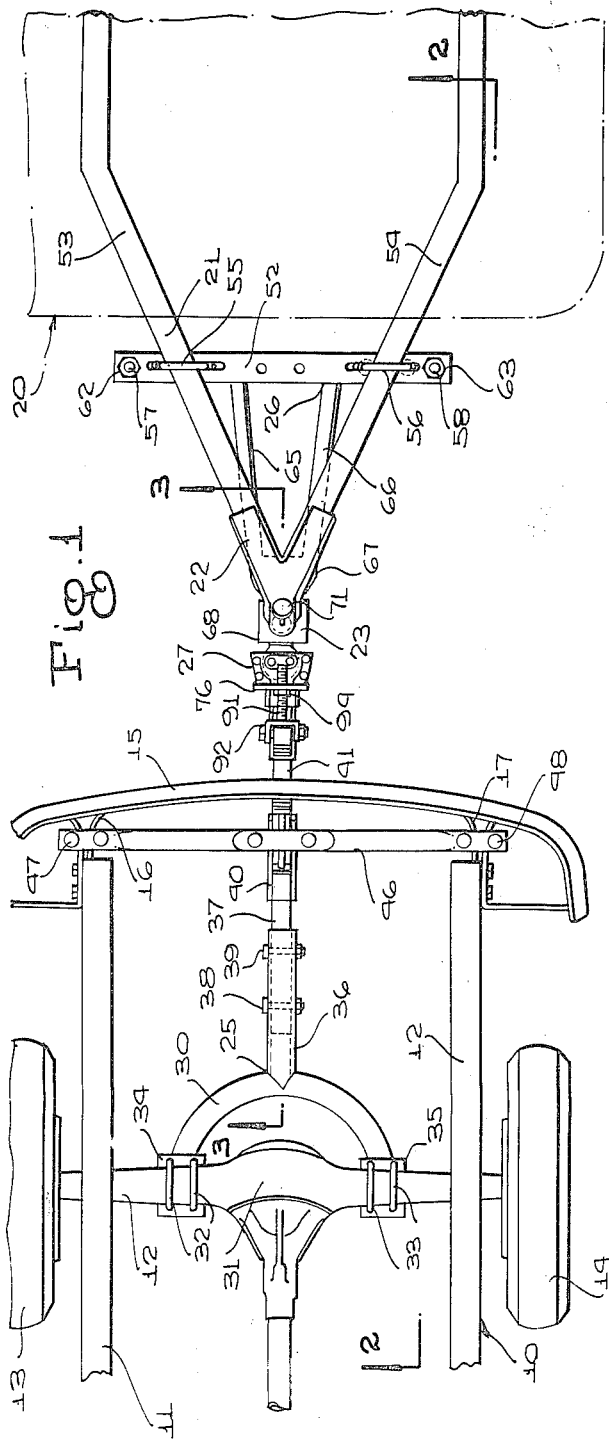
INVENTOR
CECIL C. SAXON
BY
McMorrow, Berman & Davidson
ATTORNEYS June 28, 1955
C. C. SAXON
2,711,908
TRAILER HITCH
Filed April 3, 1953
2 Sheets-Sheet 2
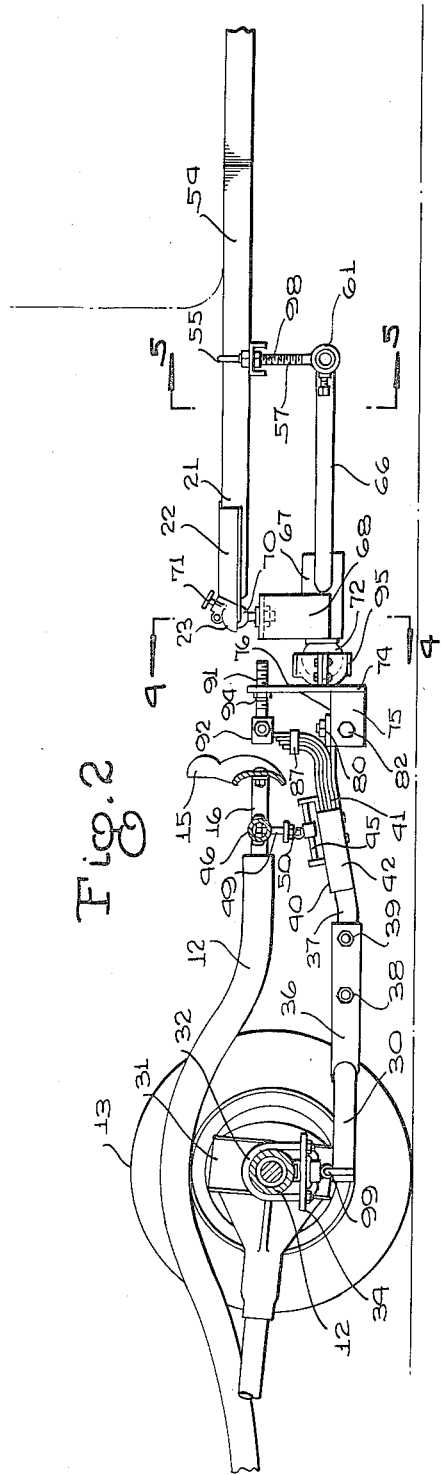
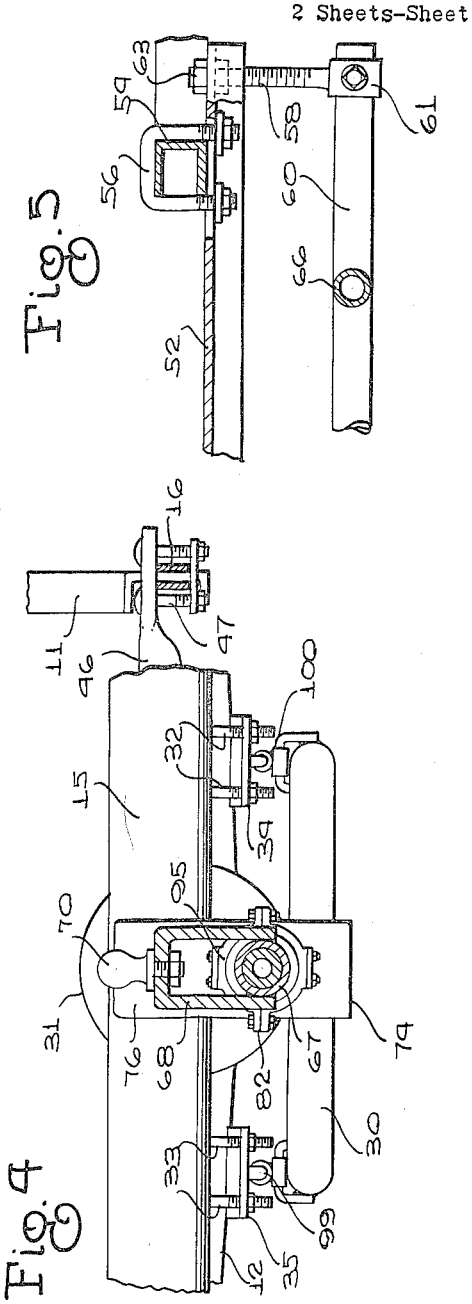
INVENTOR
CECIL C. SAXON
BY
McMorrow, Berman & Davidson
ATTORNEYS

United States Patent Office 2,711,908
Patented June 28, 1955

2,711,908

TRAILER HITCH

Cecil C. Saxon, Terre Haute, Ind.

Application April 3, 1953, Serial No. 346,621

6 Claims. (Cl. 280—406)

This invention relates to trailer hitches for connecting a towing vehicle or tractor to a towed vehicle or trailer and more particularly to an adjustable and resilient hitch assembly embodying a caster feature which urges the tractor and trailer vehicles to a relative position in which they are in longitudinal alignment with each other.

It is among the objects of the invention to provide an improved trailer hitch which includes a portion which can be rigidly secured to a towing vehicle, a portion which can be rigidly secured to a trailer vehicles, and a spring supported pivotal connection between the tractor connected and the trailer connected portions thereof; in which the pivotal connection has a skewed axis inclined in a fore and aft direction relative to the vertical so that any turning of the tractor vehicle relative to the trailer vehicle applies a lifting on one side of the trailer vehicle and creates a gravitational force tending to restore the tractor and trailer to longitudinal alignment with each other; in which an angularity of the pivotal axis to the vertical can be adjusted for different operating conditions; in which the spring supporting the pivotal connection can be adjusted for variations in the trailer load; in which the vehicle attached portions can be adjusted for variations in the relative location of the vehicle parts to which the hitch portions are connected; and which is simple, strong and durable in construction, economical to manufacture, easy to install, and effective and efficient in operation.

Other objects and advantages will become apparent from a consideration of the following description and the appended claims in conjunction with the accompanying drawings wherein:

Figure 1 is a top plan view of a hitch assembly illustrative of the invention and associated portions of a trailing vehicle and a towing vehicle;

Figure 2 is a cross sectional view on the line 2—2 of Figure 1;

Figure 3 is a cross sectional view on the line 3—3 of Figure 1;

Figure 4 is a cross sectional view on the line 4—4 of Figure 2; and

Figure 5 is a cross sectional view on the line 5—5 of Figure 2.

With continued reference to the drawings, the tractor vehicle, generally indicated at 10, may be an automobile or truck and has a frame 11 supported by the usual springs on a rear axle 12 on which are mounted the rear drive wheels 13 and 14 of the vehicle. The side members of the frame extend rearwardly of the rear axle and a rear bumper 15 is secured to the rear ends of the rear frame members by suitable bumper brackets 16 and 17. The vehicle, of course, includes various other structural members, such as frame cross members and braces, but as they are not essential to the installation of the trailer hitch assembly of the invention, they have been omitted for the purpose of simplifying the illustration.

The trailer vehicle, generally indicated at 20, may be a house trailer adapted to be towed by an automobile or light truck and has a tongue 21 of triangular shape projecting forwardly from the front end thereof and having a hitch plate 22 mounted on the front or apical end thereof and carrying a ball socket 23. The hitch assembly of the present invention includes a portion 25 connected to the towing vehicle 10, a portion 26 connected to the trailer vehicle 20 and a portion 27 pivotally connecting the rear end of the portion 25 to the front end of the portion 26.

The portion 25 of the assembly includes a yoke 30 which extends around the rear side of the differential housing 31 of the towing vehicle and is secured at its ends to the rear axle 12 of the towing vehicle at respectively opposite sides of the differential mechanism by pairs of U-bolts, as indicated at 32 and 33, extending over the rear axle housing and through corresponding apertures in apertured plates 34 and 35 secured one to each end of the yoke 30, and a tubular stem 36 extending outwardly from the yoke with its center line substantially along the line of draft of the towing vehicle. A tubular shaft 37 is slidably received in the stem 36 and adjustably secured in the stem by suitable means, such as the bolts 38 and 39 extending through diametrically opposed apertures in the stem 36 and the shaft 37 at spaced apart locations along the stem and has at one end a socket formation 40 which receives one end of a leaf spring 41. A bracket 42 is clamped onto the leaf spring 41 adjacent the outer end of the socket formation 40 and this bracket has at the upper side of the spring a pair of spaced apart and upwardly extending ears 43 and 44 between which a pin 45 is secured which pin extends longitudinally of the spring 41 at a position spaced above the top surface of the spring. A tubular bar 46 extends transversely of the towing vehicle frame at the end of the frame and is secured at its ends to the rear bumper brackets 16 and 17 by the bolt clamps 47 and 48 respectively and a rod 49 is secured to the bar 46 at the mid length location of the bar and extends downwardly therefrom. At its lower end the rod 49 is connected by a pivotal connection 50 to a sleeve or bushing 51 which slidably receives the pin 45 so that the bar 46 supports the rear end of the hitch assembly portion 25. The bar 46 also holds the front hitch assembly portion 25 at a location along the mid width location of the vehicle frame and holds this portion of the hitch assembly against lateral movement.

The rear portion 26 of the hitch assembly includes a bar 52 which is disposed below the trailer tongue 21 and extends transversely of the tongue between the socket plate or shoe 22 and the front end of the trailer vehicle. This bar is secured to the side members 53 and 54 of the tongue by the U-bolts 55 and 56 and is provided near its opposite ends with apertures receiving bolts 57 and 58 respectively. A second bar 60 is disposed below and substantially parallel to the bar 52 and has its ends secured in eye formations on the lower ends of the bolts 57 and 58, the eye formation on the lower end of the bolt 58 being illustrated in Figure 5 and designated at 61. Nuts 62 and 63 are threaded onto the bolts above the bar 52 and bear on the top surface of this bar for moving the bar 60 toward and away from the bar 52 for a purpose to be presently described.

Tubular arms 65 and 66 are secured at their rear ends to the bar 60 at locations equally spaced from the mid length location of this bar and extend forwardly from the bar 60 in slightly convergent relationship to each other. A yoke 67 is secured to and interconnects the arms 65 and 66 at the forward end of these arms and a bracket 68 is mounted on and secured to the yoke 67 and extends upwardly from the yoke.

A hitch ball 70 is mounted on the upper end of the bracket 68 and extends upwardly from the upper end of the bracket. This ball is received in the ball socket 23 on the front end of the trailer tongue 21 and is secured in the ball socket by the screw clamp 71 in a manner well known to the art. A ball 72, larger than the ball 70, is mounted on and projects forwardly from the front end of the yoke 67 and this ball is provided with a substantially diametrical bore the longitudinal center line of which is disposed substantially in a vertical plane which includes the line of draft of the towing vehicle 10 and is inclined upwardly and rearwardly at a small angle, an average angle of approximately 15 degrees having been found to provide satisfactory results in use.

An L-shaped bracket 74 is disposed at the rear end of the leaf spring 41 and has a forwardly extending, substantially horizontally disposed leg 75 and a substantially vertically disposed leg 76 extending upwardly from the rear end of the leg 75. The bottom leaf 78 of the spring 41 is extended over the top of the horizontal bracket leg 75 and secured to a U-shaped end formation 79 of this leg by a bolt 80 and a washer or reinforcing plate 81 disposed on the upper surface of the bottom spring leaf and apertured to receive the bolt 80. A bolt 82 extending through the bracket leg 75 near the front end of this leg pivotally secures the U-shaped structure 79 to the bracket leg so that this U-shaped structure has a limited freedom of rocking or tilting movement relative to the bracket 74 about a substantially horizontally disposed axis disposed at right angles to the line of draft of the towing vehicle.

The remaining leaves 83 to 86 inclusive of the spring 41 are curved upwardly at the rear end of the spring and secured together by a spring clamp 87 adjacent the ends of these leaves. The leaf 86 next to the bottom leaf 78 is provided at its rear end with a cylindrical sleeve formation 88 and a bearing bushing 89 is secured in this sleeve formation. The vertical leg 76 of the bracket 74 is provided near its upper end with an aperture 90 and a screw shaft 91 extends through this aperture in substantially horizontal position and is provided on its forward end with a yoke 92 which receives the upper end of the spring leaf 86 and the bearing bushing 89. A bearing pin or bolt 93 extends through the bushing 89 and through aligned apertures in the sides of the yoke 92 to pivotally connect the spring leaf 86 at its rear end to the yoke 92 and a nut 94 is threaded onto the screw shaft 91 at the forward side of the bracket leg 76.

A ball socket 95 is secured to the rear side of the bracket leg 76 near the rear end of the bracket leg 75 and extends rearwardly from the bracket 74. This socket receives the ball 72 and is provided with top and bottom apertures which receive a pivot pin 96 which also extends through the bore in the ball 72 and pivotally connects the ball 72 to the socket 95.

The ball 72 is rigidly secured to the yoke 67, the arms 65 and 66 and the bracket 68, and the bracket and the arms 65 and 66 are rigidly secured to the trailer tongue 21 so that any rotational movement or force imparted to the ball 72 will be transmitted to the trailer tongue 21 and will exert a force attending to raise the corresponding side of the trailer. The spring 41 is rigidly connected to the rear end of the towing vehicle and the bracket 74 and socket 95 are firmly secured to the rear end of the spring 41 so that any turning or twisting force on the ball socket 95 will be transmitted to the towing vehicle through the spring 41 and will tend to raise the side of the towing vehicle opposite the side of the trailing vehicle subjective to a lifting force through the ball 72.

With the above described arrangement and with the axis of the pivot bolt 96 inclined or skewed, as described above, when the trailing vehicle makes a turn relative to the towing vehicle a twisting force will be applied in the corresponding direction to the tongue of the trailing vehicle and the reaction to this twisting force will be applied in the opposite direction to the rear end of the towing vehicle, the inclination of the pin being such that when the two coupled together vehicles round a curve the lifting force will be applied to the outer side of the towing vehicle and to the inner side of the trailer vehicle assisting the towing vehicle to round sharp curves. This opposite twisting force between the two vehicles also provides a gravitational force by the raising of respectively opposite sides of the towing and trailing vehicles which tends to restore the two vehicles to a relative position in which they are in longitudinal alignment with each other. This self centering or caster effect between the two intercoupled vehicles has a strong effect in keeping the trailing vehicle in longitudinal alignment with the towing vehicle and in eliminating side sway and incipient jack knifing of the vehicles when traveling along the road. It is also of material assistance when the towing vehicle is being used to maneuver the trailer vehicle into a selected location.

Because of the resilient connection provided by the spring 41 between the forward and rearward portions of the trailer hitch, there will be a tendency for the trailer tongue to incline downwardly when the trailer load is above a predetermined amount and to tend to arise or incline upwardly when the trailer load is materially below the predetermined amount. The loading of the spring 41 is adjustable by threading the nut 94 along the screw shaft 91 until the stem 36 of the front yoke 30 and the yoke 67 of the rear portion 26 of the hitch are substantially in horizontal alignment and there is no strong tendency for the hitch to buckle at the pivotal connection between the front and rear portions of the hitch.

The angularity of the pivotal axis of the connection between the ball 72 and the socket 95 is adjustable by threading the nuts 62 and 63 along the corresponding bolts 57 and 58 in the appropriate direction, the angularity being decreased when the rear ends of the arms 65 and 66 are raised by threading the nuts downwardly on the corresponding bolts and increased when the nuts are threaded upwardly along the corresponding bolts permitting the rear ends of the arms 65 and 66 to move downwardly. The bar 60 and rear ends of the arms 65 and 66 are held against upward movement by suitable clamp nuts, as indicated at 98, threaded onto the bolts 57 and 58 below the bar 52 and contacting the lower surface of this bar.

It will be noted that the ends of the front yoke 30 are connected to the clamp plates 34 and 35 respectively by pivotal connections, as indicated at 99 and 100, disposed below the clamp plates so that the rear axle of the towing vehicle will have a limited freedom of rocking movement and also so that the draft exerted by the towing vehicle on the trailer hitch will have a tendency to pull the front end of the towing vehicle downwardly on the road to maintain sensitive steering control of the towing vehicle. The pin 45 is materially longer than the sleeve 51 to provide ample freedom of sliding movement between this sleeve and the associated pin to compensate for forward and rearward movements of the pivotal connections 99 and 100 incident to rocking movements of the rear axle of the towing vehicle.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A hitch comprising yoke means adapted for connection to a trailer-fixed tongue; draft means adapted to be fixed to a towing vehicle; a leaf spring having one end fixed to the draft means with its other end capable of flexure in a vertical direction; and connecting elements one carried by the second named end of the leaf spring and another by the yoke means, pivotally joined for relative swinging movement about an axis inclined slightly from the vertical in a fore-and-aft direction.

2. A hitch comprising yoke means adapted for disposition adjacent a trailer-fixed tongue; means pivotally connecting said yoke means near its forward end to the tongue and connecting said yoke means at the rear end to said tongue for selective movement toward and away from the tongue in a vertical direction; draft means adapted to be fixed to a towing vehicle; a leaf spring having one end fixed to the draft means with its other end capable of flexure in a vertical direction; and connecting elements one carried by the second named end of the leaf spring and another by the yoke means, pivotally joined for relative swinging movement about an axis inclined slightly from the vertical in a fore-and-aft direction.

3. A hitch comprising a yoke adapted to extend longitudinally of and adjacent a trailer-fixed tongue having a ball socket; means for connecting the yoke at one end to the tongue for adjustment of said end in a vertical direction relative to the tongue; draft means adapted to be fixed to a towing vehicle; a leaf spring having one end fixed to the draft means with its other end capable of flexure in a vertical direction; and connecting elements one carried by the second named end of the leaf spring and another rigid with the other end of the yoke, the connecting elements being pivotally joined for relative swinging movement about an axis inclined slightly from the vertical in a fore-and-aft direction, the yoke-fixed element including a generally vertical extension having a ball member universally movable in the socket to provide a fulcrum on which the yoke rocks during its adjustment relative to the tongue.

4. A hitch comprising a yoke adapted to extend longitudinally of and adjacent a trailer-fixed tongue having a ball socket; means for connecting the yoke at one end to the tongue for adjustment of said end in a vertical direction relative to the tongue; draft means adapted to be fixed to a towing vehicle; a laminated spring including a plurality of leaves having a common fixed connection at one end to the draft means with their other ends capable of flexure in a vertical direction, a pair of the leaves diverging at said other ends thereof; and connecting elements one carried by the divergent ends of the leaves of said pair and another rigid with the other end of the yoke, the connecting elements being pivotally joined for relative swinging movement about an axis inclined slightly from the vertical in a fore-and-aft direction, the yoke-fixed element including a generally vertical extension having a ball member universally movable in the socket to provide a fulcrum on which the yoke rocks during its adjustment relative to the tongue, the spring-attached element including a bracket pivotally attached to one leaf of the pair for swingable adjustment about a horizontal axis, and having a connection to the other leaf of the pair adapted for holding the bracket in selected positions of swingable adjustment.

5. A hitch comprising a yoke adapted to extend longitudinally of and adjacent a trailer-fixed tongue having a ball socket; means for connecting the yoke at one end to the tongue for adjustment of said end in a vertical direction relative to the tongue; draft means adapted to be fixed to a towing vehicle; a laminated spring including a plurality of leaves having a common fixed connection at one end to the draft means with their other ends capable of flexure in a vertical direction, a pair of the leaves diverging at said other ends thereof; and connecting elements one carried by the divergent ends of the leaves of said pair and another rigid with the other end of the yoke, the connecting elements being pivotally joined for relative swinging movement about an axis inclined slightly from the vertical in a fore-and-aft direction, the yoke-fixed element including a generally vertical extension having a ball member universally movable in the socket to provide a fulcrum on which the yoke rocks during its adjustment relative to the tongue, the spring-attached element including a bracket pivotally attached to one leaf of the pair for swingable adjustment about a horizontal axis, and having a connection to the other leaf of the pair adapted for holding the bracket in selected positions of swingable adjustment, the bracket being of L-shape with a substantially horizontal leg connected to said one leaf and a substantially vertical leg connected to said other leaf, the vertical leg having an opening, the connection of the vertical leg to the other leaf including a stud loosely extended through the opening and vertically swingable on said other leaf, and a nut threaded on the stud and engaging against said vertical leg.

6. A hitch comprising a yoke adapted to extend longitudinally of and adjacent a trailer-fixed tongue having a ball socket; means for connecting the yoke at one end to the tongue for adjustment of said end in a vertical direction relative to the tongue; draft means adapted to be fixed to a towing vehicle; a laminated spring including a plurality of leaves having a common fixed connection at one end to the draft means with their other ends capable of flexure in a vertical direction, a pair of the leaves diverging at said other ends thereof; and connecting elements one carried by the divergent ends of the leaves of said pair and another rigid with the other end of the yoke, the connecting elements being pivotally joined for relative swinging movement about an axis inclined slightly from the vertical in a fore-and-aft direction, the yoke-fixed element including a generally vertical extension having a ball member universally movable in the socket to provide a fulcrum on which the yoke rocks during its adjustment relative to the tongue, the spring-attached element including a bracket pivotally attached to one leaf of the pair for swingable adjustment about a horizontal axis, and having a connection to the other leaf of the pair adapted for holding the bracket in selected positions of swingable adjustment, the bracket being of L-shape with a substantially horizontal leg connected to said one leaf and a substantially vertical leg connected to said other leaf, the vertical leg having an opening, the connection of the vertical leg to the other leaf including a stud loosely extended through the opening and vertically swingable on said other leaf, and a nut threaded on the stud and engaging against said vertical leg, the pivotal joining of the connecting elements including a ball socket rigid with the bracket, a ball rigid with the yoke-fixed element and engaged in the bracket-fixed ball socket, and a connecting pin extending through the ball and bracket-fixed socket and inclined from the vertical to form the pivot axis about which said connecting elements are swingable relative to one another.

References Cited in the file of this patent
UNITED STATES PATENTS

| 2,163,999 | Jacks | June 27, 1939 |
| 2,643,891 | Mosley | June 30, 1953 |
| 2,647,761 | Kentz | Aug. 4, 1953 |

FOREIGN PATENTS

| 302,391 | Great Britain | Dec. 17, 1928 |